INVENTORS
BERNARDUS B. VAN IPEREN
Wilhelmus Kuypers
BY

AGENT

3,349,349
DEVICE FOR TUNING RECTANGULAR RESONATOR CAVITIES

Bernardus Bastiaan van Iperen and Wilhelmus Kuypers, Emmasingel, Eindhoven, Netherlands, assignors to North American Philips Company, Inc., New York, N.Y., a corporation of Delaware
Filed Sept. 3, 1965, Ser. No. 484,873
Claims priority, application Netherlands, Sept. 18, 1964, 64—10,881
2 Claims. (Cl. 333—83)

ABSTRACT OF THE DISCLOSURE

A device for tuning rectangular cavity resonators excited in the TE 0 $m$ $n$ mode coupled at one end through an output waveguide and closed at the other end. This cavity resonator is formed, in part, by a recess in a stationary conducting body, and in part by a recess in a movable conducting body, separated from each other by a gap of variable width in a plane at right angles to the Z-direction of the cavity resonator at a distance equal to $(n+\frac{1}{2})$ half waves from the closed end of the cavity resonator.

---

The invention relates to a device for tuning rectangular cavity resonators, coupled with an output waveguide. The invention particularly relates to cavity resonators suitable for wavelengths of 0.5 to 1 mm., which resonators do not exhibit reentrant parts.

The cavity resonator forms part of a velocity-modulation tube, which comprises means for producing an electron beam which is focused by a magnetic field and which traverses from a cathode in order of succession at least one modulation system, a buncher gap and an output system, the latter system comprising a rectangular cavity resonator tuned preferably to a higher harmonic. Such a rectangular cavity resonator may have a length in the longitudinal direction (Z-direction) of two or more half waves, whereas the width (Y-direction) may be one or more half waves. The height of the resonator (X-direction) is usually smaller than the distance covered by an electron of the beam in half a period. Such a cavity resonator is therefore excited in the TE 0 $m$ $n$ mode. An advantageous construction is obtained if $m=1$ and $n=2$, so that the resonator is excited in the TE 0 12 mode. It is not only necessary for this cavity resonator to be coupled with an output waveguide, but also to be tunable mechanically a few percent.

With a cavity resonator of the kind set forth such a tunability is obtained by providing, in accordance with the invention, the cavity resonator partly in the form of a recess of a stationary, conductive body and partly in the form of a recess in a movable conductive body, said bodies being separated from each other by a gap of variable width, located in a plane at right angles to the Z-direction of the resonator at a distance equal to $(n+\frac{1}{2})$ half waves from the closed end of said resonator. The gap is therefore located at a place where the current in the Z-direction through the resonator is zero.

In order to reduce leakage of the high-frequency field through the gap between the metal bodies, there may be provided, apart from the portion of the resonator formed by the recess in the movable body, a few grooves parallel to the Y-direction of the resonator. In general, the portion of the cavity resonator provided in the movable body will have a depth of one quarter wavelength. However, as an alternative, this portion may have a depth of ¼ or several times a half wave.

The gap of variable width must always be located at a place where the current in the Z-direction is zero.

Figure 1:
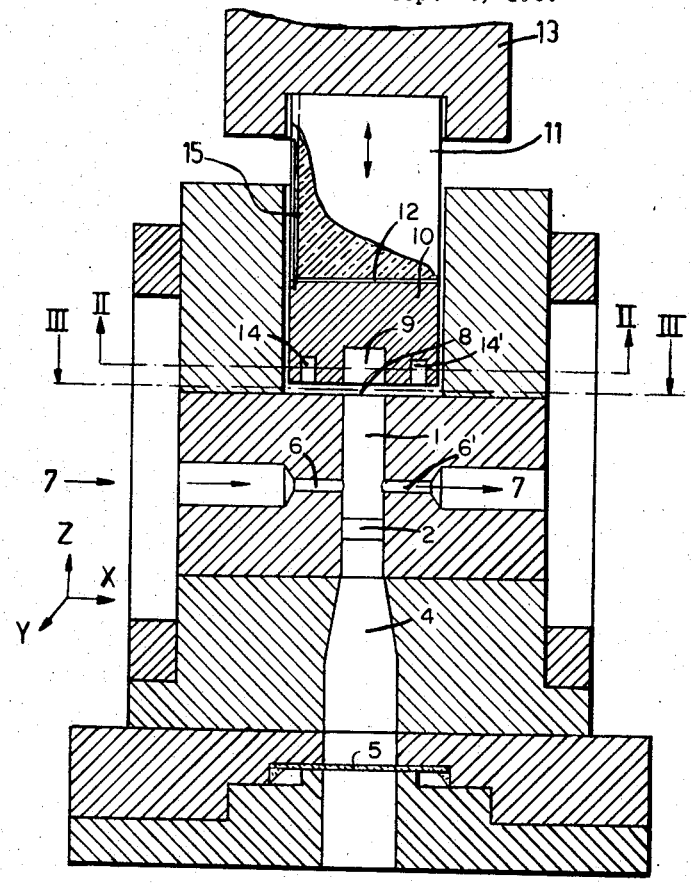
Figure 2:
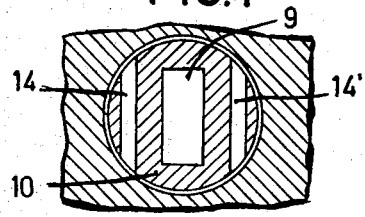
Figure 3:
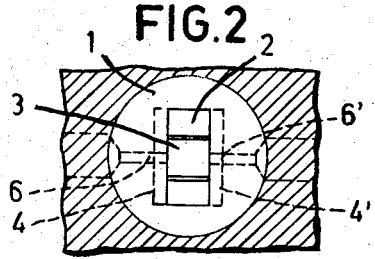
Figure 4:
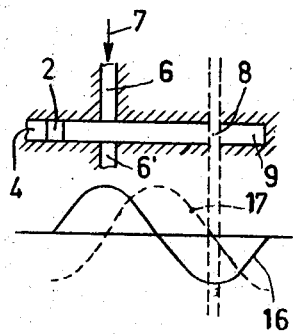

The invention will be described more fully with reference to the drawing, in which FIG. 1 is a sectional view of a tuning device according to the invention, FIG. 2 is a sectional view taken on the line II—II, FIG. 3 is a sectional view taken on the line III—III and FIG. 4 shows curves illustrating the course of the electric field and of the current in the cavity resonator.

Referring to FIG. 1, reference numeral 1 designates the cavity resonator, which is coupled at one end through an opening 3, formed by a pair of partitions 2 (FIG. 3), with the output waveguide 4. The waveguide 4 is hermetically closed by a mica window 5. At a distance of about one quarter wavelength from the partitions 2 holes 6, 6' are provided in the wall of the resonator, through which a velocity-modulated electron beam 7 can traverse the resonator in the X-direction. The dimensions in the X-direction indicate at the same time the height of the resonator. The width of the resonator extends in the Y-direction and may be one or more half waves. The length extends in the Z-direction and is at least two half wavelengths.

It will be seen from FIG. 4, curve 16, that the openings 6, 6' are provided approximately at the place of a maximum of the field intensity. These maxima of field intensity coincide with current nodes of the current travelling in the Z-direction in the resonator, which is illustrated by the curve 17.

The invention is based on the fact that at the place of such a current node a gap in the wall of the resonator may be provided without markedly affecting the quality of the resonator. This gap 8 may be varied in accordance with the invention by providing the last ¼ wavelength portion 9 of the resonator in a movable metal body 10. This body 10 is fastened by soldering material 12 to a sapphire bar 11. The sapphire bar 11 is displaceable in the direction of the longitudinal axis by means of a metal body 13. The body 13 is secured to a diaphragm (not shown), which closes the exhausted space.

In order to avoid leakage of the high-frequency field along the gap as far as possible, slots 14 are provided apart from the movable portion 9 of the cavity resonator, in the metal body 10. This body 10 is electrically connected to the body 13 by means of a conductor 15, which is accommodated in a groove of the bar 11. By varying the width of the gap 8 the cavity resonator 1 can be detuned by about 5% without markedly affecting the quality factor Q of the resonator. It has been found that a cavity resonator suitable for a wavelength of 0.8 mm. can be manufactured without great mechanical difficulty.

The various metal parts of FIG. 1 are preferably connected with each other by diffusion. In the cavity resonator according to the invention suitable for a wavelength of 0.8 mm. the height (X-direction) is 0.15 mm., whereas the width of the gap 8 is variable between 0 and 90$\mu$. A detuning of 5% of the resonator is thus obtained. The metal parts are made of red copper. The diameter of the movable body 10 is 2 mm. and the grooves in the body 10 at the side of the variable portion of the resonator have a depth of 0.1 mm. and a width of 0.2 mm., while the centre lines of said grooves are at a distance of 0.3 mm. from the centre line of the cavity resonator. The cavity resonator is tuned to the 12th harmonic of the velocity-modulation frequency of the beam. The resonator is excited in the TE 0 12 mode. For still shorter waves the TE 0 13 or TE 0 23 mode may be used, so that the dimensions of the resonator may be larger and the mechanical manufacture is facilitated.

What is claimed is:
1. A device for tuning a rectangular cavity resonator, which is excited in the TE 0 $m$ $n$ mode and which is coupled at one end through an opening with an output waveguide and is closed at the other end, while it is traversed by a velocity-modulated electron beam in the direction of height (X-direction), characterized in that the cavity resonator is provided partially by a recess in a stationary, conducting body and partially by a recess in a movable, conducting body, which bodies are separated from each other by a gap of variable width located in a plane at right angles to the Z-direction of the cavity resonator at a distance equal to $(n+\frac{1}{2})$ half waves from the closed end of the cavity resonator.

2. A device as claimed in claim 1, characterized in that the movable metal body is provided with grooves parallel to the width (Y-direction) of the resonator.

No references cited.

HERMAN KARL SAALBACH, *Primary Examiner.*

L. ALLAHUT, *Assistant Examiner.*